March 10, 1964   F. C. USHER   3,124,136
METHOD OF REPAIRING BODY TISSUE
Filed Jan. 3, 1961

INVENTOR.
F. C. USHER
BY
ATTORNEYS

United States Patent Office 3,124,136
Patented Mar. 10, 1964

3,124,136
METHOD OF REPAIRING BODY TISSUE
Francis C. Usher, Houston, Tex., assignor to Phillips Petroleum Company, a corporation of Delaware
Filed Jan. 3, 1961, Ser. No. 80,073
5 Claims. (Cl. 128—334)

This invention relates to an improved mesh for surgical use. In one aspect it relates to an improved material for surgical repair and restoration of living tissue. In another aspect it relates to means for effecting such repair and restoration without certain defects and disadvantages inherent in materials utilized in prior practice. In still another aspect, this invention relates to an improved surgical mesh for the repair of tissue defects of the abdominal wall, chest wall, diaphragm and other weaknesses of the musculoaponeurotic tissues of the body.

This application is a continuation-in-part of my copending application Serial No. 767,937, filed October 17, 1958 and now Patent No. 3,054,406.

Prior to this invention it was known to repair severed living tissue by the use of a mesh cut to the desired size and shape. Such mesh was attached to the tissues on both sides of the wound by sutures and the tissues were drawn together in such a positional relationship that healing ensued. During the healing process, the healing tissue grows through the openings in the mesh, which consequently becomes imbedded in the tissue and strengthens it. Such mesh made of polyethylene has been used to advantage on account of the inertness of polyethylene toward living tissue. However, the polyethylene which has been used in the prior art is of the so-called "high-pressure" or "low-density" type. This material has certain serious disadvantages. For example, its tensile strength is low, necessitating the fabrication of the mesh by molding in integral form, an expensive procedure. Furthermore, it is subject to severe "creep," i.e., it gradually elongates and deforms when subjected to prolonged tension. This elongation or deformation is permanent and therefore an obvious disadvantage in surgical applications. In addition, low-density polyethylene cannot be heat sterilized under the usual hospital sterilization conditions without damage. This type of sterilization is preferred over other methods because it is convenient and readily applicable to the sterilization of large numbers of articles simultaneously and the subsequent maintenance of the sterilized articles in sterile condition for extended periods of time.

An object of this invention is to provide a surgical mesh of improved applicability to the repair and restoration of living animal tissue, especially human tissue. Another object is to provide a surgical mesh having increased strength. A further object is to provide a surgical mesh of improved flexibility and adaptability to muscular movement during convalescence and consequently of increased comfort to the patient. An additional object is to provide a surgical mesh which is compatible with and nonirritating toward living animal tissue. An additional object is to provide a nonmetallic surgical mesh which can be steam-sterilized without damage. Another object is to provide a knitted surgical mesh having the above described advantages and properties. Other objects and advantages will be apparent to those skilled in the art upon consideration of this disclosure.

Several embodiments of my invention are illustrated in the accompanying drawings.

FIGURE 10 is a cross section of a knitted surgical mesh having the stitch structure illustrated in FIGURE 1.

Figure 1:
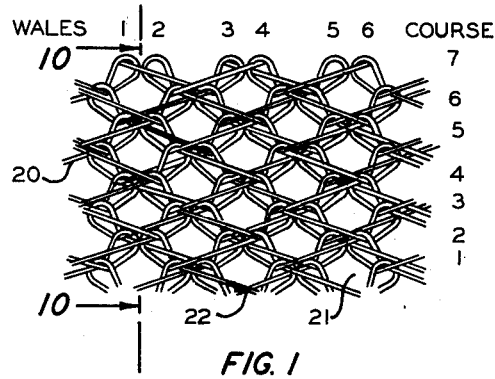
FIGURE 1 is a fragmentary, diagrammatic view illustrating the stitch structure of one surgical mesh of the invention.

According to the invention of said copending application, there is provided a woven surgical mesh made of polyethylene thread or yarn having a tensile strength in the range 50,000 to 150,000 p.s.i. According to the present invention, there is provided a knitted surgical mesh made of the same type polyethylene thread or yarn. The polyethylene must be free of water-leachable irritant impurities such as antioxidants and catalyst residues in order to prevent irritation and inflammation of animal tissue. The polyethylene mesh of my invention is inert and nonirritating even in the presence of infection.

The success of said woven surgical mesh in the field of surgical repair and restoration of living tissue has been outstanding. It has been successfully used in a large number of cases for the repair of tissue defects and wounds of the abdominal wall, chest wall, diaphragm and other weaknesses of the musculoaponeurotic tissues of the human body. I have now found that a knitted mesh is much superior to said woven mesh.

An advantage of the woven mesh of said copending application, the threads of which are not mechanically joined at their points of contact, is that it is highly pliable and adaptable to the movements of the muscles and tissues to which it is attached, thus increasing the comfort of the patient.

I have found the knitted surgical mesh of the present invention to be even more flexible, more pliable, and better suited for use in surgical prosthesis than said woven surgical mesh. This was surprising in view of the higher thread count and the greater thickness of the knitted surgical mesh as compared to the woven surgical mesh. The knitted surgical mesh adapts itself better to the contour of the tissues to which it is sutured than does the woven surgical mesh. The knitted surgical mesh has "two-way stretch," a feature which is very desirable in that sudden strains will not result in "pull out" of sutures. The increased elasticity of the knitted mesh also makes it easier to tailor the prosthesis to the defect or wound being repaired.

The tensile strength and "flex life" of the knitted surgical mesh is greater than that of the woven surgical mesh. As a result, fragmentation and fracture of the fibers due to repeated flexing is much less, being what is believe to be minimal. This maintenance of the structure of the mesh is important to satisfactory healing and repair of the tissue defect or wound.

There is considerably less tendency of the cut edge of the knitted surgical mesh to ravel, a fault which is inherent in the woven surgical mesh and which causes "pull out" (unless the edges of the woven mesh are heat sealed) of sutures placed too near the edge. It is not necessary to heat seal the cut edge of the knitted surgical mesh before placing the prosthesis in place for suturing.

The individual threads or yarn of which the mesh is made according to this invention can be monofilaments or multifilaments. An important advantage of the invention resides in the possibility of using relatively fine yarn or thread, with resulting flexibility of the mesh knitted therefrom, and still obtaining the requisite tensile strength. Such was impossible when the low-density polyethylene of the prior art was used; therefore, the prior practice was to resort to a molded mesh to obtain the requisite strength at a sacrifice of pliancy and, consequently, of comfort to the patent.

The polyethylene mesh of this invention must have a structure which is sufficiently porous to allow abundant growth of tissue through the graft without sacrificing tensile strength and "body" which are so essential in this type of prosthesis. A knitted mesh with an average spacing between filaments of 5 to 50 mils can be employed. Usually a monofilament with a diameter of 1 to 10 mils is used to knit the mesh. When a relatively large spacing between threads is employed, it is usually preferred to use a relatively large diameter monofilament within the stated diameter range. A warp knit has been employed to give the mesh exceptional tensile strength and to prevent runs and raveling.

The knitted surgical mesh of the invention can be made on any standard two-bar warp loom. As is well known in the knitting art, mesh or net fabrics are easily obtained in warp knitting by employing partially threaded guide bars. The knit meshes most commonly employed in the practice of the invention are those made on a two-bar loom with half-set threading, i.e., only alternate guides in each guide bar are provided with threads.

Any suitable knit mesh having a construction which provides the above described degree of porosity can be employed in the practice of the invention. I have found that knit meshes having a texture or quality of from 30 to 75, preferably 35 to 65, courses per inch and from 20 to 50, preferably 25 to 40, wales per inch can be used in accordance with the invention. As is well known to those skilled in the art of warp knitting, the number of courses and wales per inch in a knitted material is affected by a number of machine operating variables such as (a) the rate at which the fabric is drawn away from the needles, and (b) the amount of tension applied to the warp threads, and also variables after the material leaves the machine. Thus, as used herein and in the claims, unless otherwise specified, the definition of the knitted polyethylene mesh in number of wales and courses per inch refers to the finished mesh after all processing operations have been completed.

Details concerning the knitting techniques which can be employed to make the knitted polyethylene mesh of the invention can be found in "Warp Knitting Technology" by D. F. Paling, Harlequin Press, London (1952). Other details concerning warp knitting techniques can be found in "Man Made Textile Encylopedia," J. J. Press editor, pp. 456–472, Textile Book Publishers, New York, (1959).

Examples of suitable knitted meshes include, among others, those produced when employing the following pattern wheel or chain drum arrangements and threading.

| No. | Pattern Chain Arrangement | Threading [1] |
|---|---|---|
| 1 | Front guide bar, 1-0/2-3<br>Back guide bar, 2-3/1-0 | \|·<br>\|· |
| 2 | Front guide bar, 1-0/1-2/2-3/2-1<br>Back guide bar, 2-3/2-1/1-0/1-2 | \|·<br>\|· |
| 3 | Front guide bar, 1-0/1-2<br>Back guide bar, 1-0/1-2 | \|·<br>·\| |
| 4 | Front guide bar, 1-0/1-2/1-0/1-2/2-3/2-1/2-3/2-1<br>Back guide bar, 2-3/2-1/2-3/2-1/1-0/1-2/1-0/1-2 | \|·<br>\|· |

[1] |=thread in; ·=thread out.

The knitted surgical mesh made from the polyethylene described herein has a sufficiently high softening point to withstand the standard sterilization by heating in an autoclave at a temperature of 245° F. (steam pressure of 15 p.s.i.g.) for 20 to 30 minutes or boiling in water for 30 minutes. In some instances, sterilization by chemical means is preferred. The mesh is non-wettable by water and is not damaged in any way by the sterilization, provided the temperature is maintained below that at which deformation of the polymer occurs. The mesh can be cut to the desired pattern after sterilization, or standard sizes and shapes can be prepared prior to sterilization. As mentioned above, it is not necessary that the edges of the cut knitted mesh be heat sealed before placing the prosthesis in place for suturing. However, if desired, the edges of the mesh can be heat sealed by searing with a cautery or they can be turned under as with the woven mesh of said copending application. In either case, sutures can be placed within 1/8 inch of the edge under considerable tension without pulling out. A skilled surgeon can devise suitable sizes and shapes of the polyethylene fabric as well as suitable means of inserting and suturing this material. The sutures can be made of the same type polyethylene as the mesh in accordance with this invention. Said sutures can be either monofilament, or multifilament formed as by braiding or twisting monofilaments.

The polyethylene utilized to prepare the mesh of this invention is generally known in the art as a "high-density" or "low-pressure" polyethylene. It has the following characteristics in addition to those already mentioned:

Density—At least 0.940 gm./cc., preferably 0.950 to 0.980,

Molecular weight—At least 30,000, preferably 40,000 to 80,000.

Methods of preparing such polyethylenes are now known in the art. A much preferred polyethylene for the purposes of this invention can be prepared as described in U.S. Patent 2,825,721 (1958). Preferably, the polyethylene is prepared by polymerization of ethylene in the presence of a catalyst comprising chromium oxide, in which part of the chromium is hexavalent, supported on porous silica-alumina gel, at a polymerization temperature from about 250 to about 320° F. and a pressure of about 400 to about 700 p.s.i., the catalyst being suspended in an inert hydrocarbon such as cyclohexane during the polymerization. Catalyst is removed from the reactor effluent by filtration or centrifugation, and the polyethylene is recovered from solution in the cyclohexane filtrate. A typical polyethylene produced in this manner, and used in the specific examples hereinafter, has approximately the following properties:

Density _____ gm./cc__ 0.960
Molecular weight _____ 40,000

Monofilaments can be produced from polyethylene of the type just described by melting the polyethylene, extruding to form a filament (melt spinning) and cold-drawing the filament to from about 5 to about 20 or more times its original length at a temperature in the range 100 to 250° F. If desired, the cold-drawn filament can be pre-shrunk by immersion in boiling water for several minutes.

The low-density polyethylenes utilized in the prior art have densities of 0.930 or lower and molecular weights of less than 25,000.

High-density polyethylenes used according to this invention have a mass (nonfilamentary) tensile strength of the order of 4000 to 5000 p.s.i. When extruded and cold drawn to form a monofilament (as hereinbefore described) having a diameter of the order of 5 to 10 mils, the resulting polyethylene, as a filament, has a tensile strength of the order of 90,000 p.s.i., presumably as a result of molecular orientation. An important advantage of my invention over the formerly used molded low-density polyethylene mesh now becomes apparent. Such a mesh, not having been cold-drawn, can have no more than its mass of non-filamentary tensile strength, which is of the order of 2000 p.s.i. Even if the prior art polyethylene were used in the form of cold-drawn monofilaments the tensile strength would be no greater than about 30,000 p.s.i. Thus the enormous increase in strength on cold-drawing, exhibited by high-density polyethylene is utilized to advantage according to my invention. This property allows a surgeon to use safely a polythylene mesh made of finer fibers than has heretofore been possible. Such mesh has increased pliancy as well as great strength and physiological inertness.

FIGURE 1 in the drawings illustrates the stitch structure of one embodiment of my invention wherein threads 20 are knitted in a tricot pattern to provide openings 21. The threads cross each other at points 22 at which there is no mechanical attachment of the threads to each other. The mesh here illustrated is sometimes referred to as a pinhole mesh. This structure is produced when employing the pattern chain and threading set forth above as No. 1.

Figure 2:
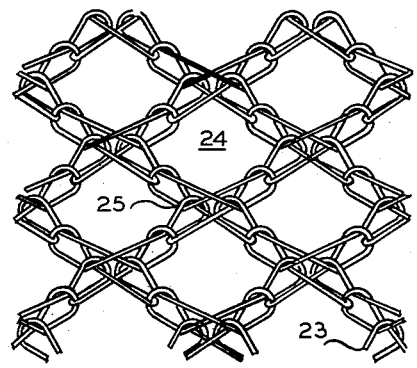
FIGURE 2 is a fragmentary, diagrammatic view illustrating the stitch structure of another surgical mesh of the invention.

FIGURE 2 of the drawings illustrates the stitch structure of another embodiment of my invention wherein threads 23 are knitted in a tricot pattern to provide openings 24. In this embodiment, as in all embodiments of the invention the threads cross each other at points 25 at which there is no mechanical attachment of the threads to each other. The stitch structure of this embodiment is similar to that of the embodiment illustrated in FIGURE 1, except that the openings in FIGURE 2 are larger than those in FIGURE 1. This stitch structure is produced when employing the pattern chain arrangement and threading set forth above as No. 2.

Figure 3:
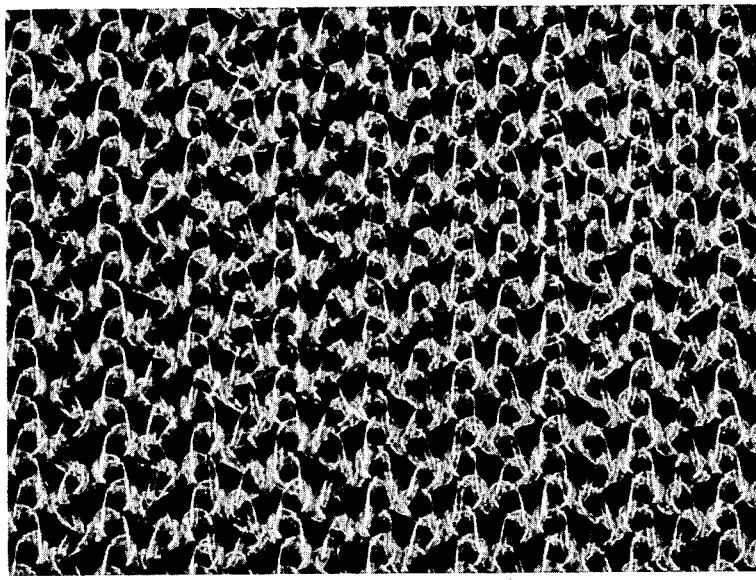
FIGURE 3 is a photograph on a magnified scale (10×) of an actual surgical mesh of the type illustrated in FIGURE 1.

FIGURE 3 is a photograph on a magnified scale (10×) of an actual surgical mesh having the stitch structure illustrated in FIGURE 1 and produced from a polyethylene monofilament 6 mils in diameter on a 28 gauge two-bar warp loom with self-set threading. This material has a texture or quality of 40 courses per inch and 34 wales per inch. This material is presently the most preferred surgical mesh of the invention.

Figure 4:
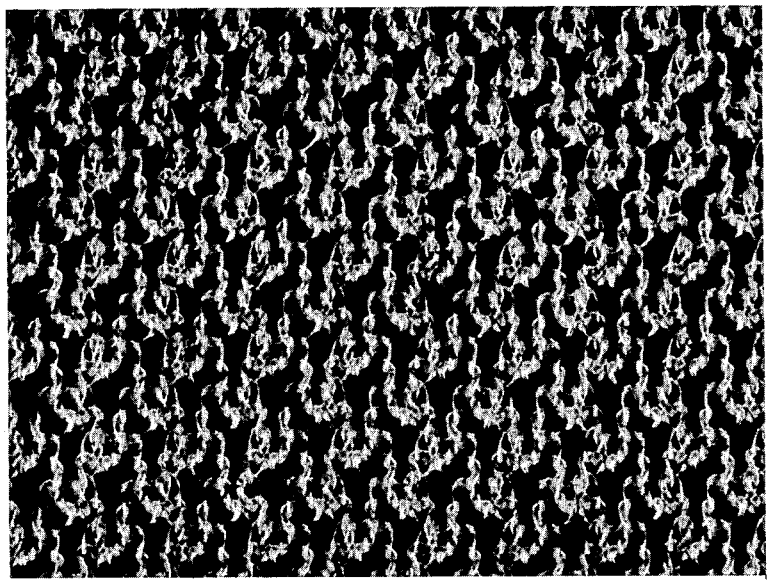
FIGURE 4 is a photograph on a magnified scale (10×) of an actual surgical mesh of the type illustrated in FIGURE 2.

FIGURE 4 is a photograph on a magnified scale (10×) of another actual surgical mesh of the invention having the stitch structure illustrated in FIGURE 2 and which was produced from a polyethylene monofilament of 6 mils diameter on a 28 gauge two-bar warp loom with half-set threading. This material has a texture or quality of 56 courses per inch and 30 wales per inch.

Figure 5:
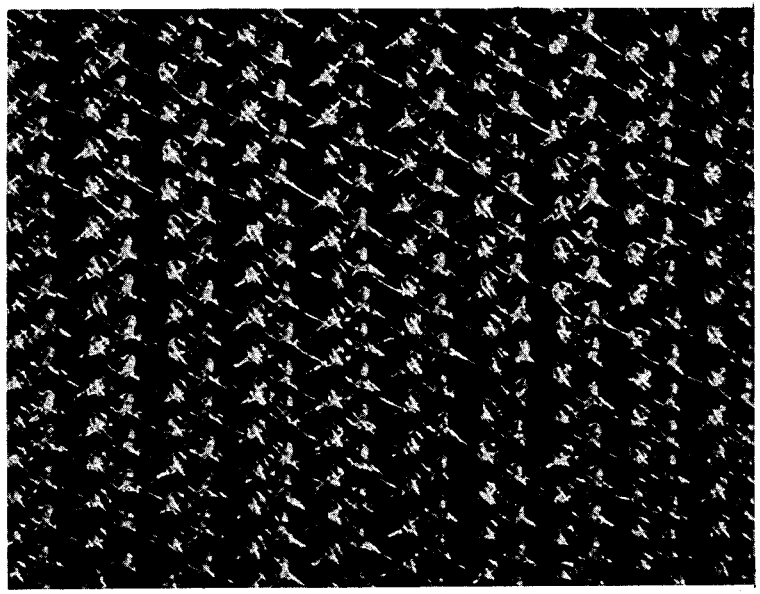
FIGURE 5 is a photograph on a magnified scale (10×) of another actual surgical mesh of the invention.

FIGURE 5 is a photograph on a magnified scale (10×) of another actual surgical mesh of the invention which was produced from a polyethylene monofilament of 6 mils diameter on a 28 gauge two-bar warp loom with half-set threading. This material has a texture or quality of 60 courses per inch and 36 wales per inch. This material was produced when employing the pattern chain arrangement and threading set forth above as No. 3.

Figure 6:
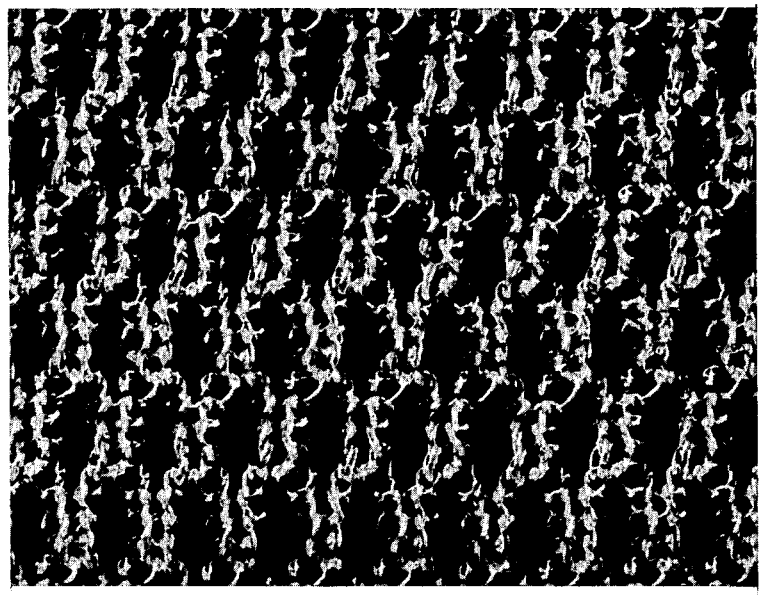
FIGURE 6 is a photograph on a magnified scale (10×) of another actual surgical mesh of the invention.

FIGURE 6 is a photograph on a magnified scale (10×) of still another actual surgical mesh of the invention which was produced from a polyethylene monofilament of 6 mils diameter on a 28 gauge two-bar warp loom with half-set threading. This material has a texture or quality of 56 courses per inch and 25 wales per inch. This material was produced when employing the pattern chain arrangement and threading set forth above as No. 4.

Figure 7:
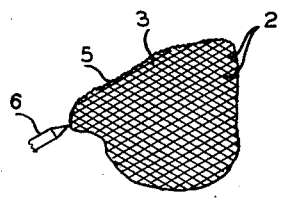
FIGURE 7 illustrates a modification of the invention; the mesh stitch structure is a schematic representation of that illustrated in FIGURES 1 and 3.

FIGURE 7 illustrates a further embodiment of my invention. As here shown, a mesh knitted of threads 2 and having openings 3 is heat sealed along its edge to provide a heat seal or bead 5. The numeral 6 illustrates any desired type of heating instrument which will perform a fusion of the thread ends. An advantage of heat sealing as illustrated in FIGURE 7 is to provide a strengthening of the edge against raveling or pulling out of sutures. As pointed out above, an important advantage of the knitted mesh over the woven mesh is that this heat sealing is not necessary with the knitted mesh as with the woven mesh.

Figure 8:
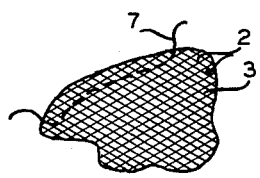
FIGURE 8 illustrates another modification of the invention and particularly illustrates the use of sutures in connection therewith; the mesh stitch structure is a schematic representation of that illustrated in FIGURES 1 and 3.

One method of suturing a knitted mesh in accordance with my invention is illustrated in FIGURE 8. Here, a suture 7 is utilized to attach the mesh to tissue. It will be noted that, in this embodiment, the suture is passed more or less parallel to the edge of the prosthesis. I have found that sutures can be attached within ⅛ inch of the edge and will hold securely without pulling out. This embodiment illustrates an important advantage of my invention which will become apparent to those skilled in the art when it is considered that most prosthesis are sutured after being turned under at their edges.

Figure 9:
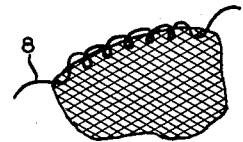
FIGURE 9 illustrates a modification of the embodiment of the invention illustrated in FIGURE 8; the mesh stitch structure is a schematic representation of that illustrated in FIGURES 1 and 3.

FIGURE 9 illustrates an embodiment wherein a different suturing technique from that illustrated in FIGURE 8 is utilized. In this embodiment, a suture 8 is passed repeatedly around the edge 5. Each of the loops or spirals of the suture can pass through the tissue.

Figure 10:
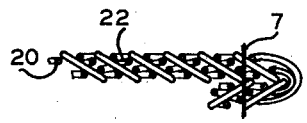
FIGURE 10 illustrates a further modification of the invention and particularly a modified use of sutures therewith. Said

FIGURE 10 illustrates another manner of using my invention. In this method of use, the edges of the mesh are sutured to tissue on one side of the wound, either by continuous or interrupted sutures. The mesh is then drawn across the wound and folded under as illustrated in FIGURE 10 to the desired pattern and then suture 7 is passed through the folded edge as illustrated in FIGURE 10, to effect an attachment of the mesh to the tissue on the other side of the wound or incision.

Figure 11:
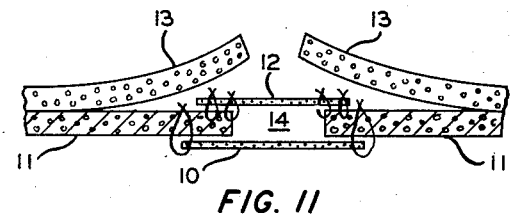
FIGURE 11 illustrates another modification of the invention and particularly another method of using the surgical mesh of the invention.

FIGURE 11 illustrates another manner of using my invention. In this method of use, two layers of the knitted mesh are used. One layer 10 is sutured to the inner aspect 11 of the tissue to be repaired and a second layer 12 of the knitted mesh is sutured to the outer aspect of the tissue to be repaired.

An additional and important advantage of my invention is that the mesh is inert in the presence of infection and does not have to be removed should be the surgical wound become infected. Granulation tissue will grow through the mesh and normal wound healing will take place.

Because of the soft, flexible nature of the mesh in accordance with this invention, the mesh can be used as a prosthesis within the abdomen or chest without injury to the viscera of the chest or abdominal cavity, e.g., lungs, intestines, liver, etc.

A further feature of the mesh according to my invention is that this mesh has the advantage over metallic meshes in that, once it has been implanted as a surgical prosthesis, it can be cut through in subsequent operations, and again resutured in a manner not unlike operating through normal tissues. This cannot be done in the case of metallic meshes.

Further, in accordance with my invention, a polyethylene knitted mesh as previously described herein can be placed on the inner surface of the abdominal or chest wall as a reinforcement or to replace a tissue defect. In this method of operation, the mesh is attached to the inner aspect of the abnominal or chest wall by means of mattress sutures. To my knowledge, this method has never been feasible prior to the advent of my invention.

Still further in accordance with my invention, two layers of the knitted mesh can be used to repair large tissue defects, as in the chest or abdominal wall. In this method of operation, one layer of the mesh is attached to the inner aspect of the tissue to be repaired and a second layer of the mesh is attached to the outer aspect of the tissue to be repaired. To my knowledge, this method has never been feasible prior to my invention.

In the following specific examples, a polyethylene mesh knitted from 6-mil polyethylene monofilament having a tensile strength of about 90,000 p.s.i. was utilized. The polyethylene from which the monofilament was prepared had properties previously specified herein. The monofilament was prepared by melt-extruding the polyethylene through a 0.021-inch orifice at 575° F., quenching in a water bath at 65–70° F., cold-drawing the quenched filament by stretching it, in a steam bath at 212° F., to 10 times its original length, and winding the drawn monofilament onto a spool.

*Example I*

I have carried out a series of tests to investigate the use of the high-density polyethylene described above for surgical prosthesis. Initially the material was tested in the form of small particles or pellets to determine the tissue reaction. The method used by the U.S. Bureau of Mines (Public Health Report, 56:264, 1941, Miller et al.) was employed in these tests. The plastic in the form of small particles or pellets was implanted intraperitoneally in dogs, and seven days later the animals were sacrificed and the intra-abdominal viscera examined grossly for adhesion and other evidence of inflammatory reaction. Microscopic studies were also made of the tissues for confirmation of the gross findings. Three dogs were used for each plastic tested. It was shown that polyethylene is well tolerated in tissues and precipitates considerably less foreign body reaction than does nylon, Orlon or Dacron, tested under the same conditions.

*Example II*

After establishing that there was very little or no tissue reaction to this polyethylene and also that a mesh knitted from a monofilament as described above, had favorable physical properties, an investigation was undertaken to determine its usefulness in repairing tissue defects in dogs. Defects in the abdominal wall, chest wall, and diaphragm were made by excising rectangular blocks of tissue and suturing the knitted polyethylene mesh over the defect. The skin was closed over the implant using braided polyethylene sutures.

Results of the above described tests can be summarized briefly as follows: Inspection of the grafts at re-operation two weeks postoperative, at three weeks postoperative, at autopsy and histological examination showed the mesh to be well infiltrated with pliable fibrous tissue. Foreign body reaction was minimal. Examination of the polyethylene mesh after six months' implantation showed no fragmentation and no decrease in tensile strength.

Previous infection studies have indicated that granulation tissue would grow through the mesh in the presence of purulent infection without slough of the graft or sinus formation. The amount of fibrous tissue formed in the infected wounds was found to be essentially the same as that present in the clean wounds that healed by primary intention. The inertness of the polyethylene mesh in the presence of infection is one of the most important characteristics of this new plastic. It is comparable to tantalum mesh in this respect. Comparisons with Teflon fabric implanted as a control showed more uniform infiltration of the polyethylene mesh and better bondage of this latter material to surrounding tissues.

*Example III*

Because of the successful results obtained in the experimental work with dogs, the knitted polyethylene mesh was used in human beings in the surgical repair of hernias and other defects of the abdominal wall. It was found that the knitted mesh could be sutured under considerable tension without sutures "pulling out" of the mesh, even when the edges of the mesh were not heat sealed.

A technique has been developed in which the knitted polyethylene mesh is attached to the inner side of the peritoneum by sutures extending through the peritoneum, muscle layers, and outer fascia covering the muscle. Situated on the inside of an open defect in this manner, the graft appeared to have greater mechanical advantage than if it had been placed over the defect.

Another technique has been developed in which one layer of the knitted polyethylene mesh is sutured to the inner aspect of the tissue to be repaired and a second layer of the knitted mesh is sutured to the outer aspect of the tissue to be repaired. This technique has been very effective in repairing large defects in the abdominal wall. This technique is illustrated in FIGURE 11 where a first layer 10 of knitted polyethylene mesh is sutured to the inner aspect of tissue 11 and a second layer 12 of said knitted polyethylene mesh is sutured to the outer aspect of said tissue 11. Thus, the two layers of mesh effectively bridge the large defect in tissue 11. The outer layer of tissue 13 can be closed over the graft in regular manner. Bridging large defects in the manner described appears to have a greater mechanical advantage than where only one layer of the mesh is sutured to the inner aspect of the tissue to be repaired. It has been observed that the space 14 between the ends of tissue 11 fills with fibrous tissue during the healing process and fibrous tissue also grows through the two layers of mesh. Operations employing this technique have been highly successful.

Polyethylene mesh has also been used to repair inguinal hernias.

Palpation of the wounds of these patients two to three months following operation revealed an intact and pliable abdominal wall. The edges of the graft were difficult to delineate from the surrounding fascia and there were no ridges from buckling or wrinkling of the graft. There have been no recurrences to date in any of these patients.

The exact shape or form of the knitted polyethylene mesh prosthesis which is required and the means of inserting, suturing, and the like can be determined readily by one skilled in this art in view of this disclosure.

*Example IV*

Reference has been made above to the much superior pliability of the knitted surgical mesh as compared to the woven surgical mesh of my said copending application. A sample of said woven mesh made from 6 mil diameter polyethylene monofilament and a sample of knitted mesh also made from 6 mil diameter polyethylene monofilament identified herein as No. 1 and illustrated in FIGURES 1 and 3 were tested for pliability. The test procedure employed was the "Proposed Methods of Test for Evaluation of Properties Related to the Hand of Soft-Finished Woven Fabrics" developed under the jurisdiction of ASTM Committee D-13, and described on pp. 742–745 of "ASTM Standards on Textile Materials," November 1958, American Society for Testing Materials, Philadelphia, Pa. The apparatus employed in the tests here reported embodied the essential features of the apparatus there described.

According to said ASTM test the distortion angle of a fabric may be used as a measure of the pliability of said fabric. The greater the distortion angle, the greater the relative pliability. The distortion angle is defined as the total angle through which a fabric may be distorted in its own plane without producing wrinkles in its surface.

The results of measurements of the distortion angle of said woven mesh and said knitted mesh were as follows.

| Surgical mesh tested: | Distortion angle—degrees |
|---|---|
| Woven mesh | 2.5 |
| Knitted mesh | 12 |

The above results show the knitted mesh to have a relative pliability almost five times that of the woven mesh. It is believed these results clearly substantiate the qualitative observations, with respect to the superiority of the knitted mesh over the woven mesh, made during the actual use of said meshes as surgical prostheses.

While the invention has been described in terms of using the knitted polyethylene mesh in the form of more or less flat or planar pieces of material, it is within the scope of the invention to employ knitted polyethylene mesh in the form of a knitted tube which may be used as an arterial graft. Such a tube can vary in size from ¼ inch or less to 1¼ inches or more in diameter, depending on the particular size required for any specific repair operation. A snugly knitted tube is preferred. It must be knitted tightly enough to prevent any blood leakage or sweating. It has been found that a twisted multifilament yarn is preferred in making said knitted tubes. Usually a multifilament yarn of about 40 to about 400 denier is employed. For applications in which the arterial graft becomes subject to a bending action, such as occurs at a knee or hip joint, it is essential that the replacement section will not kink during normal activity of the patient. This is essential in order to eliminate the possibility of clotting or sludging of the blood in this repair section. For use in areas of the body in which there is no kinking or bending taking place, a straight, knitted arterial graft may be employed. One method of providing a so-called nonkinking arterial graft is to form it in the form of a tube which has accordion-like pleats. This can be accomplished by knitting a straight tube on a regular tube knitting machine and then accordion pleating the straight tube by various techniques known to the art. Also, it is possible to knit a tube in such a manner that the accordion pleats are formed during the knitting process.

The properties of the polyethylene and the polyethylene filament referred to in this disclosure and in the claims are defined and determined as follows:

*Density.*—Density is ordinarily determined on a sample of the mass polyethylene in nonfilamentary form. The sample is prepared by compression molding of the polyethylene at a temperature of 340° F. in a mold provided with a water jacket through which water can be circulated. The sample is maintained at about 340° F. until it is completely molten. It is then cooled from 340 to 200° F. at the rate of approximately 10 Fahrenheit degrees per minute. Water is then circulated through the mold to continue the cooling to 150° F., the rate not exceeding 20 Fahrenheit degrees per minute. The polyethylene is then removed from the mold and cooled to room temperature. A small piece of the solidified polyethylene is cut from the compression molded sample and inspected to make sure that it is free of voids and that it has a sufficiently smooth surface to prevent the trapping of air bubbles thereon. The small sample is placed in a 50-ml. glass-stoppered graduate. Carbon tetrachloride and methyl cyclohexane are then allowed to run into the graduate from separate burrettes in such proportions that the sample is suspended in the mixed solution, i.e., it neither floats nor sinks. The graduate is shaken during the addition of liquid in order that the two liquids mix thoroughly. A total liquid volume of 15 to 20 ml. is required. After the liquids have been so proportioned that the polyethylene is suspended therein without sinking or floating, the density of the liquid mixture is equal to the density of the solid polyethylene. The polyethylene is then removed from the liquid and a portion of the liquid mixture of carbon tetrachloride and methylcyclohexane is transferred to a Westphal balance and the specific gravity of the liquid is measured at a temperature in the range 73 to 78° F. This specific gravity is equal to the specific gravity of the polyethylene. For most practical purposes, the specific gravity can be considered identical to the density. However, if a precise conversion to actual density units (grams per cc.) is desired, this is readily referable to water at 4° F. by calculations which will readily be evident to those skilled in the art. The precision of a single specific gravity determination is ordinarily within ±.0002.

*Molecular weight.*—The molecular weight determination is based upon a measurement of the intrinsic viscosity of the polyethylene. The intrinsic viscosity is determined by measuring the time required for a filtered solution of 0.1000 gram of the polyethylene in 50 ml. of tetralin (measured at room temperature, i.e., about 75° F.) to run through the marked length on a size 50 (0.8–3.0 centistokes) Ostwald-Fenske viscosimeter at a temperature of 130° C. (the viscosimeter being immersed in a thermostatically controlled oil bath) and measuring also the time required for an equal volume of tetralin containing no polyethylene to run through the same distance on the same viscosimeter. The molecular weight is calculated in accordance with the following formula:

$$M_w = \frac{K 2.303 \log V_r}{C}$$

where $K=24{,}450$
$C=0.183$
$V_r=$ time, in seconds, required for solution to run through viscosimeter divided by the corresponding time required for the polymer-free tetralin, both at 130° C.

A single determination of molecular weight ordinarily has a precision of ±1000 molecular weight units.

The tensile strength of the mass, nonfilamentary polyethylene is determined by ASTM Method D–412–51T (Die C), the specimen being drawn at a rate of 20 inches per minute. This method applies to compression molded samples and specimens.

The tensile strength of the filamentary polyethylene is determined by ASTM Method D–1380–55T modified in that a 4-inch gauge length of the filament or yarn is used and the sample is stretched at the rate of 12 inches per minute.

Although certain processes, structures and specific embodiments have been described for purposes of illustration, it will be clear to those skilled in the art that the invention is not limited thereto.

I claim:

1. A method of repairing damaged living animal tissue, which method comprises: attaching a first layer of a physiologically inert knitted surgical mesh to the inner aspect of said tissue adjacent the site of damage; attaching a second layer of said knitted surgical mesh to the outer aspect of said tissue adjacent the site of damage so that said first and second layers of mesh effectively bridge said site of damage; said mesh being knitted from a polyethylene thread free of water-leachable irritant impurities, and having from 20 to 50 wales per inch and from 30 to 75 courses per inch to form openings therein which permit growth of tissue therethrough, the threads within said mesh being unattached to one another at their points of crossing and having, individually, a tensile strength in the range of 50,000 to 150,000 p.s.i. and a diameter in the range of 1 to 10 mils; and causing said mesh to remain in place during the healing of said tissue.

2. A method according to claim 1 wherein the mesh is cut to the desired size and shape prior to attachment to said tissue, the edges are heat sealed by fusion of said threads, and the mesh thus prepared is attached to said tissue by means of polyethylene sutures.

3. A method of repairing damaged living animal tissue, which method comprises: attaching a first layer of a physiologically inert knitted surgical mesh adjacent the site of damage; attaching a second layer of said knitted surgical mesh to the outer aspect of said tissue adjacent the site of damage so that said first and second layers of mesh effectively bridge the site of damage; and causing said mesh to remain in place during the healing of said tissue, said mesh being formed of a polyethylene thread free of water-leachable irritant impurities, the threads within said mesh being unattached to one another at their points of crossing and having, individually, a tensile strength in the range of 50,000 to 150,000 p.s.i. and a diameter in the range of 1 to 10 mils, and said mesh having from 25 to 40 wales per inch and from 35 to 65 courses per inch to form openings therein which permit growth of tissue therethrough.

4. A method of repairing damaged living animal tissue, which method comprises: attaching a first layer of a physiologically inert knitted surgical mesh to the inner aspect of said tissue adjacent the site of damage; attaching a second layer of said knitted surgical mesh to the outer aspect of said tissue adjacent the site of damage so that said first and second layers of mesh effectively bridge said site of damage; said mesh being knitted from a polyethylene thread free of water-leachable irritant impurities, and having openings therein which permit growth of tissue therethrough, the threads within said mesh being unattached to one another at their points of crossing and having, individually, a tensile strength in the range of 50,000 to 150,000 p.s.i. and a diameter in the range of 1 to 10 mils; and causing said mesh to remain in place during the healing of said tissue.

5. A method according to claim 4 wherein the mesh is cut to the desired size and shape prior to attachment to said tissue, the edges are heat sealed by fusion of said threads, and the mesh thus prepared is attached to said tissue by means of polyethylene sutures.

References Cited in the file of this patent

UNITED STATES PATENTS

| | | |
|---|---|---|
| 2,433,279 | Johnson | Dec. 23, 1947 |
| 2,594,521 | Tingley | Apr. 29, 1952 |
| 2,671,444 | Pease | Mar. 9, 1954 |
| 2,825,721 | Hogan et al. | Mar. 4, 1958 |
| 3,054,406 | Usher | Sept. 18, 1962 |

FOREIGN PATENTS

| | | |
|---|---|---|
| 538,782 | Belgium | Dec. 6, 1955 |

OTHER REFERENCES

Text—"Warp Knitting Technology" by D. F. Paling, published 1952 by Harlequin Press, Manchester and London, England, copy available Div. 21, see pages 62–65.

The Lancet, Feb. 20, 1954, page 395 required.

The Lancet, May 8, 1954, page 983 required.